US005663859A

United States Patent [19]

Knapp

[11] Patent Number: 5,663,859

[45] Date of Patent: Sep. 2, 1997

[54] DISCONNECTOR SWITCH FOR DISCONNECTING A HIGH-VOLTAGE ARRESTER FROM GROUND

[75] Inventor: Todd Kim Knapp, Waukesha, Wis.

[73] Assignee: Cooper Industries, Inc., Houston, Tex.

[21] Appl. No.: 633,162

[22] Filed: Apr. 16, 1996

[51] Int. Cl.[6] ........ H02H 7/04

[52] U.S. Cl. ........ 361/38; 361/35; 324/547

[58] Field of Search ........ 361/35, 38, 39, 361/40, 117, 118, 126, 127, 131, 132; 324/547, 551–553

[56] References Cited

U.S. PATENT DOCUMENTS

| | | | |
|---|---|---|---|
| 3,313,983 | 4/1967 | Mallett et al. | 361/39 |
| 4,063,298 | 12/1977 | Tornetta et al. | 361/40 |
| 4,743,996 | 5/1988 | Book | 361/39 |
| 4,975,797 | 12/1990 | Veverka et al. | 361/35 |

*Primary Examiner*—Jeffrey A. Gaffin
*Assistant Examiner*—Ronald W. Leja
*Attorney, Agent, or Firm*—Burns, Doane, Swecker & Mathis LLP

[57] ABSTRACT

An electric device, such as a transformer, has a tank and an arrester for protection against high voltage surges, the arrester being grounded to a wall of the tank. A switch is mounted in the tank wall for enabling the ground connection to be disconnected from outside the tank. The switch includes a shaft extending slidably through an opening in the tank wall. A gripping handle is mounted on an outer end of the shaft, and a spring washer is mounted on an inner end of the shaft. The spring washer is electrically connected to a discharge side of the arrester and is movable toward the wall and into electrically conductive relationship therewith in response to sliding of the shaft. By sliding the shaft in a direction moving the washer away from the wall, the electrical connection is broken. The handle is threadedly mounted to the shaft to be reversible between a first position holding the shaft in its switch closed position, and a second position for enabling the shaft to be slid to its switch open position.

18 Claims, 2 Drawing Sheets

FIG. 3
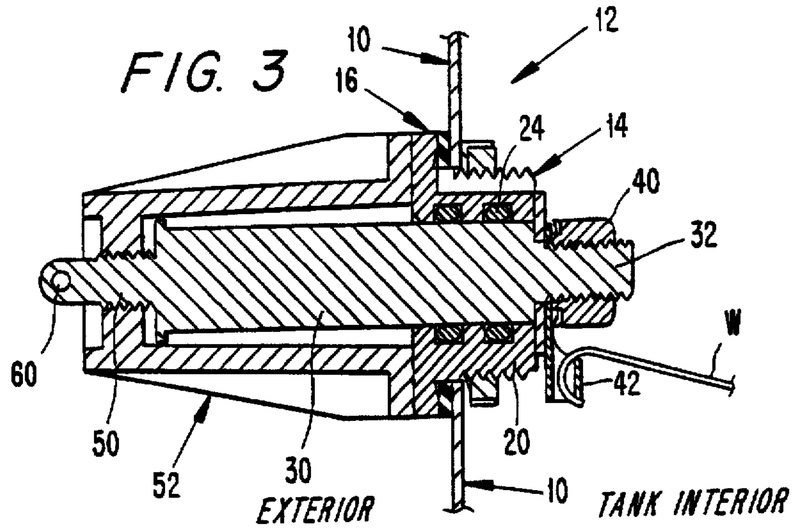
FIG. 4
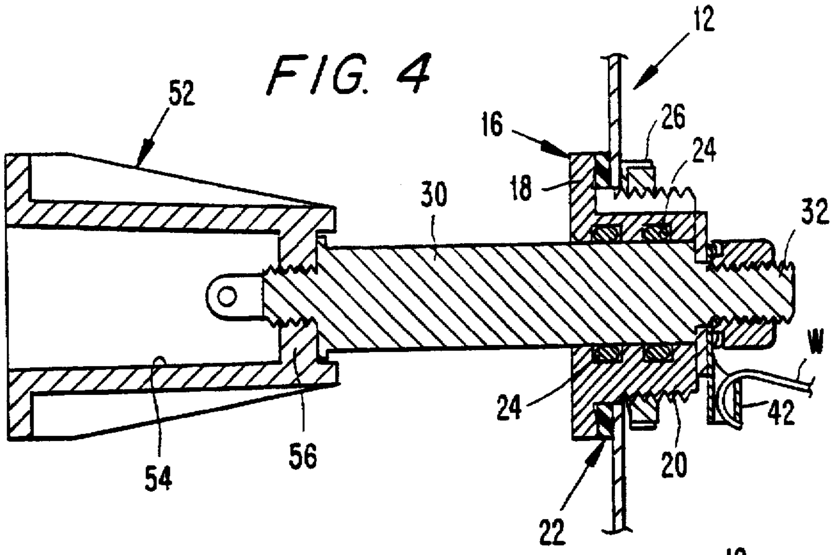
FIG. 5
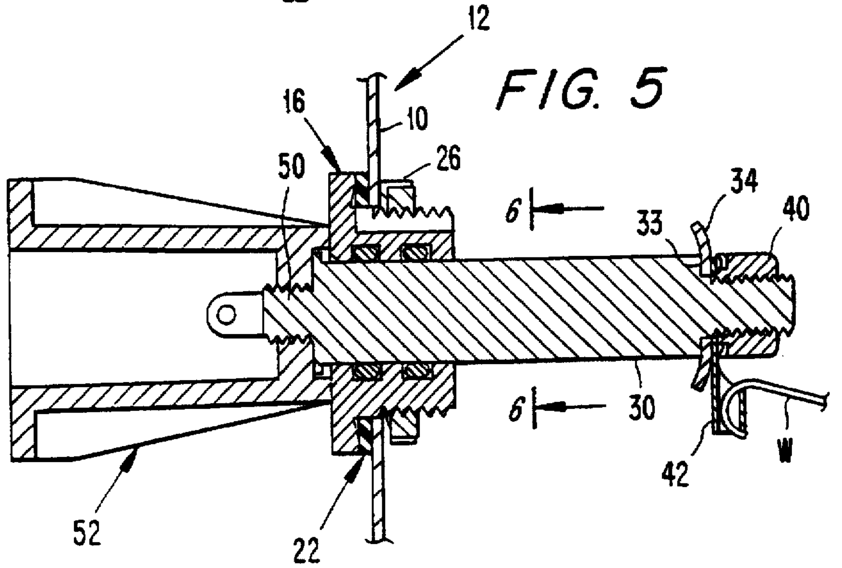
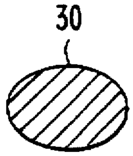
FIG. 6

DISCONNECTOR SWITCH FOR DISCONNECTING A HIGH-VOLTAGE ARRESTER FROM GROUND

BACKGROUND OF THE INVENTION

The present invention relates to lightning arresters which provide protection against high voltage transients in sealed tanks, such as electric transformers, and in particular to a switch for enabling such an arrester to be disconnected from outside the tank.

Depicted in FIG. 1 is an electric pole-mount transformer 1 described in commonly assigned U.S. Pat. No. 4,975,797. The transformer includes a tank 2 which contains a coil/core assembly 3, i.e., two cores 4 around which are wound coils 5. The assembly 3 is submerged in an insulative oil 6. Mounted on the assembly 3 is an arrester 7 which electrically interconnects a primary wire 8 and an insulator 9. A ground wire 9A electrically interconnects the arrester 7 with a tank wall by means of a stud 9B welded on the tank wall. The arrester 7 protects against high voltage surges by discharging same to ground via the tank. However, the external ground wire 9A is exposed and may be susceptible to damage, and it is required that a stud be welded to the tank exterior to provide a terminal for the ground wire.

It has also been previously proposed to locate the ground wire internally to the tank. However, it is desirable to be able to test the transformer under high voltage conditions, which requires that the ground connection of the arrester be disconnected. If the ground wire is located within the tank, it becomes necessary to open the tank cover in order to disconnect the ground connection. That results in the seal between the tank cover and tank body being disturbed, which is undesirable.

Depicted in FIGS. 2A and 2B is a prior art arrester disconnector switch 100 which can be used in an electrical transformer tank having a lightning arrester, wherein the ground wire is located internally to the tank. The switch 100 includes an externally and internally threaded gland 104 mounted in the tank wall 102 by means of a locknut 105. A gasket 107 is compressed between the wall and an inside end of the gland 104. A threaded end 109 of a hollow tube 106 is threadedly mounted to the fitting 104. The tube 106 is filled with oil and carries a terminal 108 biased toward the wall 102 by means of a coil spring 111. The terminal 108 is electrically connected to a lead 110 which is electrically connected to the ground terminal of an arrester (not shown). A shaft 112 is slidably mounted within the gland. One end of the shaft 112 carries an electrically conductive piston 114 and a pair of guide washers 116, 118. The opposite end of the shaft is in the form of an externally threaded plug 120, having a hexagonal head 122.

When the shaft 112 is in an extended state (FIG. 2B), the piston 114 is disengaged from the terminal 108, whereby there is no electrical coupling between the ground lead 110 and the tank wall 102. When the shaft 112 is pushed-in, and the threaded plug is attached to the gland, as shown in FIG. 2A, the piston 114 contacts the terminal 108, whereby the ground lead 110 is electrically connected to the tank wall through the piston, shaft 112 and gland 104. Thus, when the transformer is to be tested, the thread 120 is unscrewed, and the shaft is pulled out as shown in FIG. 2B to disconnect the arrester ground.

A shortcoming of such a structure is the need to provide an oil-filled tube 106 and a coil spring-biased terminal 108, which can increase the overall cost of the switch. Also, the operating instructions require that the plug 120 be provided with pipe tape or other thread sealant before screwing the plug to the fitting, in order to seal against oil leakage.

It would be desirable to enable an arrester ground connection to be disconnected without disturbing the tank seal, while eliminating the presence of an externally exposed ground wire, external welded-on stud, an oil-filled tube and a spring-mounted contact within such a tube.

SUMMARY OF THE INVENTION

The present invention relates to an electrical device including a sealed tank, a lightning arrester disposed in oil within the tank, and a switch mounted in a wall of the tank for making an electrical connection between the arrester and the tank wall. The switch comprises a shaft slidably mounted in an opening formed in the wall such that an outer end of the shaft is accessible from outside of the tank to enable the shaft to be slid within the opening for moving an inner end of the shaft toward the tank wall to a switch-closed position or away from the wall to a switch-open position. An electrically conductive element is mounted on the shaft adjacent the inner end thereof for being moved toward the wall and into electrically conductive relationship with the wall when the shaft is moved to the switch-closed position, and for being moved away from the wall and into electrically nonconductive relationship with the wall when the shaft is moved to the switch-open position. The electrically conductive element is electrically connected to the arrester.

The switch preferably includes a handle mounted on the outer end of the shaft. The handle is movable relative to the shaft between a first position for bearing against the wall to hold the shaft in the switch-closed position, and a second position enabling the shaft to be moved to the switch-open position.

Preferably, the handle is threadedly mounted to the shaft and is removable and reversible relative to the shaft when being moved between its first and second positions.

The electrically conductive element preferably comprises a spring washer.

The present invention also relates to the structure of the switch per se.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 3 is a longitudinal sectional view taken through a switch according to the present invention, in a switch-closed position;

FIG. 4 is a view similar to FIG. 3 after a handle of the switch has been unscrewed and reversed;

FIG. 5 is a view similar to FIG. 4 after the switch has been moved to a switch-open position; and FIG. 6 is a sectional view taken along the line 6—6 in FIG. 5.

DETAILED DESCRIPTION OF A PREFERRED EMBODIMENT OF THE INVENTION

Figure 1:
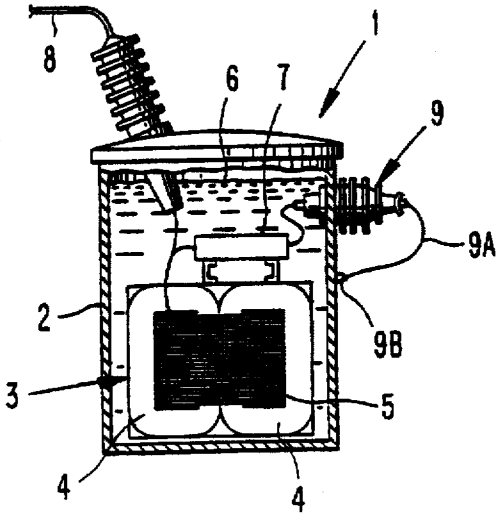
FIG. 1 (PRIOR ART)
FIG. 1 is a vertical sectional view taken through a prior art transformer.
Figure 2A:
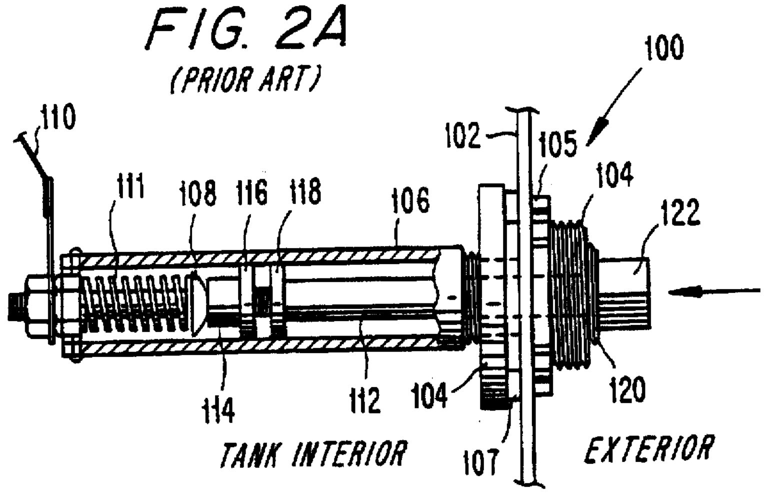
FIG. 2A (PRIOR ART)
FIG. 2A is a side elevational view, partially in longitudinal section, of a prior art switch in a switch-closed position.
Figure 2B:
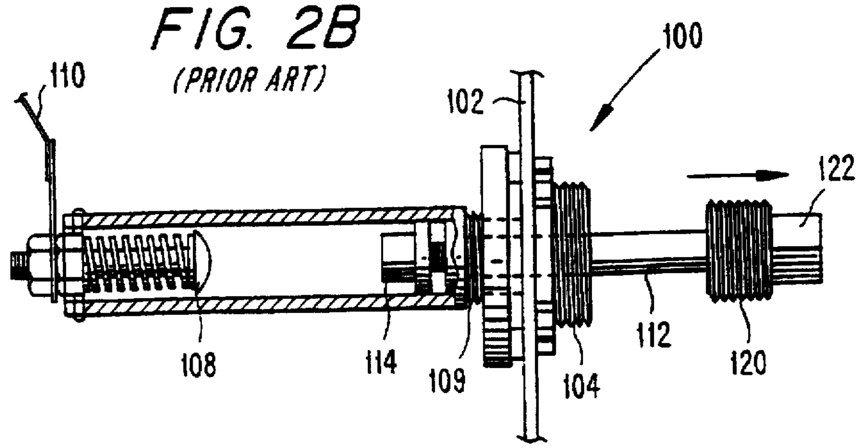
FIG. 2B (PRIOR ART)
FIG. 2B is a view similar to FIG. 2A when the prior art switch is in the switch-open position.

Although the invention is disclosed below in connection with a transformer, it is to be understood that the invention can be used in conjunction with any electrical device utilizing an oil-filled sealed tank in which a lightning arrester is employed.

With reference to FIGS. 3–5, there is mounted on a wall 10 of a transformer 12 a switch 14 which is manipulable from the exterior of the tank. (The tank exterior is to the left in FIG. 3.) The switch includes a sealing gland 16 which has a flange 18 dispose on the exterior side of the tank, and an externally threaded, hollow shank portion 20 extending through a hole formed in the tank wall 10. A gasket 22 formed of an elastomeric sealing material is sandwiched between the flange 18 and the external side of the wall 10. O-ring seals 24 are mounted in grooves formed in an inner wall of the shank portion 20.

A locknut 26 is threadedly mounted on the shank portion 20 to secure the sealing gland to the tank wall. The tank 10, sealing gland 16 and locknut 26 are formed of an electrically conductive material.

Slidably mounted within the sealing gland is a shaft 30. The O-rings 24 bear against an outer periphery of the shaft to create a liquid-tight seal therewith. As shown in FIG. 6, the shaft has a non-circular cross-sectional shape, e.g. elliptical, to prevent the shaft from rotating.

Projecting from an inner end of the shaft is an externally threaded tip 32 of circular cross sectional shape. The tip 32 is of smaller cross section than the shaft 30 so that a radial shoulder 33 is formed therebetween against which a spring contact washer 34 bears. That washer 34 is formed of an electrically conductive material. As is evident from FIG. 5, the spring contact washer, when in a relaxed state, is of curved or bent configuration such that its outer edge points toward the wall 10. (Alternatively, a flat washer could be utilized.) The washer 34 is pressed against the shoulder 33 by a nut 40 threadedly mounted on the tip 32. Sandwiched between the nut 40 and the washer 34 is an electrically conductive terminal 42 to which is connected a ground wire W of the arrester 7, e.g., by solder. It may be desirable to mount a spring element (not shown) on the shaft to bias yieldably the washer to the left in FIG. 3.

Projecting from an outer end of the shaft 30 is an externally threaded tip 50. Threadedly mounted on the tip 50 is a handle 52. The handle 52 includes a recessed portion 54 and an end wall 56 which is threadedly connected to the tip 50.

The shaft 10 is formed of electrically non-conductive materials, such as suitable plastic material.

In the drawing, FIG. 3 depicts the switch 14 in a closed (current-conducting) state; FIG. 5 depicts the switch in an open state; and FIG. 4 depicts the switch in an intermediate closed state.

In operation of the switch, the switch is in a closed state (FIG. 3) during normal operation of the transformer. An electrical ground connection between the arrester and the transformer tank wall 10 is formed by the wire W, the terminal 42, the washer 34, the sealing gland 16, and the locknut 26. The washer 34 is deformed to a planar state by being pressed against the sealing gland 16. The force effecting such compression is established by the handle 52 which is screwed tightly against the flange 18 of the sealing gland, and thereby pulls the shaft 30 to the left in FIG. 3. When it is desired to perform a high voltage test, the ground (discharge) side of the arrester is disconnected by the following steps. The handle 52 is unscrewed from the tip 50 and is reversed and then rethreaded to the tip 50, as shown in FIG. 4. Then, by pushing the handle 52, the shaft 30 is slid toward the tank interior, thereby disengaging the washer 34 from the sealing gland to interrupt the electrical grounding path (see FIG. 5). The terminal can now be tested under high voltage conditions.

To electrically reconnect the arrester to the tank wall 10, the above-described steps are reversed. That is, the handle 52 is grasped and pulled to the left until the washer 34 contacts the sealing gland 16. Then, the handle 52 is unscrewed from the tip 50, reversed, and screwed back onto the tip 50. The handle is then rotated until it bottoms-out against the sealing gland. By then rotating the handle a pre-set amount, e.g. one-half-turn, the handle becomes locked in position, with the washer 34 abutting the sealing gland 16.

If desired, the outer end of the tip 50 can be provided with a hasp having a hole 60 capable of receiving a padlock to prevent unauthorized tampering with the switch. When the shaft 30 has been displaced far enough to ensure good contact between the washer 34 and sealing gland 16, the hasp hole 60 will be exposed sufficiently to enable the padlock (not shown) to be connected. The presence of a padlock prevents the handle from being removed and ensures that the switch cannot be accidentally opened.

It will be appreciated that a switch according to the present invention enables the arrester ground to be disconnected without having to open the tank and disturb the tank seal. Importantly, that is accomplished without the need for a ground wire disposed on the outside of the tank, which wire would be exposed and susceptible to damage. Also, since there is no external wire, there is no need to provide an electrically conductive stud on the tank exterior for making connection therewith. The sealing gland of the present invention provides an electrical ground connection while simultaneously providing a liquid seal, avoiding the need for pipe tape and the like.

Although the present invention has been described in connection with preferred embodiments thereof, it will be appreciated by those skilled in the art that additions, deletions, modification, and substitutions not specifically described may be made without departing from the spirit and scope of the invention as defined in the appended claims.

What is claimed is:

1. In an electrical device including a sealed tank, a lightning arrester disposed in oil within the tank, and a switch mounted in a wall of the tank for making an electrical connection between the arrester and the tank wall, the switch comprising:

a shaft slidably mounted in an opening formed in the wall such that an outer end of the shaft is accessible from outside of the tank to enable the shaft to be slid within the opening for moving an inner end of the shaft toward the wall to a switch-closed position and away from the wall to a switch-open position, and an electrically conductive element mounted on the shaft adjacent the inner end thereof for being moved toward the wall and into electrically conductive relationship with the wall when the shaft is moved to the switch-closed position, and for being moved away from the wall and into electrically non-conductive relationship with the wall when the shaft is moved to the switch-open position, the electrically conductive element being electrically connected to the arrester.

2. In the electrical device according to claim 1 wherein the switch further comprises a handle mounted on the outer end of the shaft; the handle being movable relative to the shaft between a first position for bearing against the wall to hold the shaft in the switch-closed position, and a second position enabling the shaft to be moved to the switch-open position.

3. In the electrical device according to claim 2 wherein the handle is threadedly mounted to the shaft and is removable and reversible relative to the shaft when being moved between its first and second positions.

4. In the electrical device according to claim 1 wherein the electrical device is a transformer and includes a coil/core assembly disposed in oil within the tank.

5. In the electrical device according to claim 2 wherein the electrically conductive element comprises a spring washer.

6. In the electrical device according to claim 1 wherein the electrically conductive element comprises a spring washer.

7. In the electrical device according to claim 6 wherein the switch further comprises a nut threadedly mounted on the inner end of the shaft, a terminal disposed between the nut and the spring washer and pressed against the spring washer by the nut, the terminal being electrically connected to a wire connected to the arrester.

8. In the electrical device according to claim 7 wherein the switch further comprises a hollow sealing gland including a flange disposed externally of the tank, and an externally threaded shank extending through the opening, the shaft being slidably mounted in the sealing gland, a fluid seal interposed between the sealing gland and the shaft and a locknut threadedly mounted on the shank for locking the sealing gland to the wall, an electric path from the terminal to the wall being defined by the terminal, spring washer, sealing gland, and locknut.

9. In the electrical device according to claim 8 wherein the opening and shaft are of non-circular cross-sectional shape so that the shaft is non-rotatable in the opening.

10. In the electrical device according to claim 9 including a hasp having a hole formed on the outer end of the shaft for receiving a padlock.

11. In the electrical device according to claim 1 wherein the shaft is formed of an electrically non-conductive material.

12. In an electrical device including a sealed tank, a lightning arrester disposed in oil within the tank, and a switch mounted in a wall of the tank for making an electrical connection between the arrester and the tank wall, the switch comprising:

a shaft mounted on the tank wall for movement relative thereto between switch-open and switch-closed positions, the shaft formed of an electrically non-conductive material and including inner and outer ends, the inner end disposed within the tank and carrying an electrically conductive element arranged to be placed in electrically conductive relationship with the tank wall when the shaft is in the switch-closed position, and for being out of conductive relationship with the tank wall when the shaft is in the switch-open position, and a handle threadedly mounted on the outer end of the shaft and being releasable and reversible relative to the shaft between a first position for bearing against the tank wall to hold the shaft in the switch-closed position, and a second position enabling the shaft to be moved to the switch-open position.

13. In the electrical device according to claim 12 wherein the shaft is slidable relative to the wall such that the outer end of the shaft is movable toward and away from the tank wall.

14. An electrical switch adapted to be mounted in an opening of a tank wall, the switch comprising:

a hollow sealing gland mountable in the opening;

a shaft formed of an electrically non-conductive material and slidably movable in the sealing gland, a manually actuable first end of the shaft being accessible from one side of the wall for displacing a second end of shaft toward and away from the wall; and an electrically conductive element mounted on the shaft adjacent the second end thereof and being electrically connectible to a component disposed to the second side of the wall, the electrically conductive element being disposed in electrically conductive relationship with the wall when the second end of the shaft is slid toward the wall to a switch-closed position, and out of such electrically conductive relationship when the shaft is slid away from the wall to a switch-open position.

15. The switch according to claim 14, further including a handle connected to the outer end of the shaft to be removable and reversible relative thereto between first and second positions, the handle engaging the wall when in its first position to hold the shaft in the switch-closed position, the handle enabling the shaft to be slid to the switch open position when the handle is in its second position.

16. The switch according to claim 15 wherein the shaft is of non-circular cross section.

17. The switch according to claim 14 wherein the electrically conductive element is a spring washer.

18. The switch according to claim 14 including an elastomeric sealing member disposed between the sealing gland and the shaft.

* * * * *